(12) United States Patent
Hoch

(10) Patent No.: US 6,764,781 B2
(45) Date of Patent: Jul. 20, 2004

(54) INTERMITTENT COOLING OF FUEL CELL

(75) Inventor: Martin Monroe Hoch, Webster, NY (US)

(73) Assignee: General Motors Corporation, Detroit, MI (US)

(*) Notice: Subject to any disclaimer, the term of this patent is extended or adjusted under 35 U.S.C. 154(b) by 331 days.

(21) Appl. No.: 10/074,671

(22) Filed: Feb. 13, 2002

(65) Prior Publication Data
US 2003/0152816 A1 Aug. 14, 2003

(51) Int. Cl.[7] .................................................. H01M 8/04
(52) U.S. Cl. .............................. 429/13; 429/26; 429/30
(58) Field of Search ............................... 429/13, 26, 30

(56) References Cited

U.S. PATENT DOCUMENTS 5,503,944 A    4/1996  Meyer et al. ................. 429/13
6,309,774 B1   10/2001 Buchner et al. ............... 429/38

FOREIGN PATENT DOCUMENTS

EP    0074701    4/1982

Primary Examiner—Hoa Van Le
(74) Attorney, Agent, or Firm—Cary W. Brooks

(57) ABSTRACT

Process for improving the efficiency of a fuel cell system having a liquid coolant and a pump circulating the coolant through the fuel cell and a heat exchanger that extracts heat from the coolant. Improved efficiency is achieved by intermittently shutting off the pump when the fuel cell is operating at less than 25% of its "full power" design point.

10 Claims, 1 Drawing Sheet

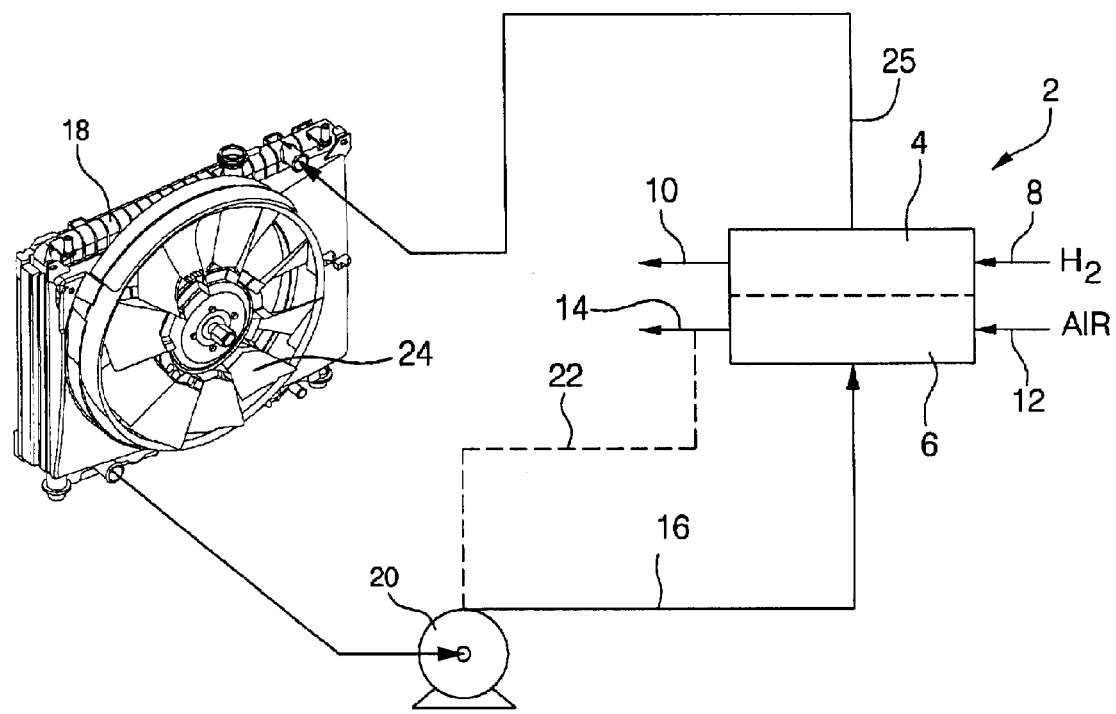

INTERMITTENT COOLING OF FUEL CELL

TECHNICAL FIELD

This invention relates to liquid cooled fuel cell systems, and more particularly to improving the efficiency thereof by reducing the parasitic drain imposed thereon by the coolant pump when the fuel cell is operating under low power conditions.

BACKGROUND OF THE INVENTION

A fuel cell is an electrochemical device for continuously converting a fuel and an oxidant into electricity. It consists of two electrodes (i.e. an anode and cathode) separated by an ion-conducting electrolyte with provision for the continuous movement of fuel (e.g. $H_2$), oxidant (e.g. $O_2$), reaction product (e.g. $H_2O$), and coolant into and out of the cell. Fuel is continuously supplied to, and oxidized at, the anode (negative electrode), and provides electrons to an external circuit. Oxidant is continuously supplied to, and reduced at, the cathode (positive electrode) where it receives the electrons from the external circuit. An ionic current in the electrolyte completes the circuit. A plurality of individual fuel cells bundled together is often referred to as a fuel cell "stack".

PEM (proton exchange membrane) fuel cells [a.k.a. SPE (solid polymer electrolyte) fuel cells] are well known $H_2/O_2$-based fuel cells that are ideal for mobile applications (e.g., electric vehicles), and may have the hydrogen stored in a compressed or liquefied state, or generated from reformed methanol, gasoline, diesel fuel or the like. PEM fuel cells include a "membrane electrode assembly" (a.k.a. MEA) comprising a thin, proton-transmissive, solid-polymer membrane-electrolyte having an anode on one of its faces and a cathode on the opposite face. The MEA is sandwiched between a pair of electrically conductive elements that serve as current collectors for the anode and cathode. The current collectors also serve to distribute the fuel cell's gaseous reactants over the surfaces of the anode and cathode. The solid polymer membranes are typically made from ion exchange resins such as perfluoronated sulfonic acid (e.g. NAFION from DuPont) that are hydrated to promote ionic conductivity therethrough. The anode and cathode typically comprise finely divided carbon and catalyst particles and proton conductive resin intermingled therewith.

In addition to the fuel cell itself, fuel cell systems require a variety of auxiliary equipment (e.g. pumps, heat exchangers, fuel processors, combusters, water separators, etc.) to support the operation of the fuel cell. Some of the auxiliary equipment is energized by the fuel cell in that they draw power from the fuel cell for their operation, and accordingly are essentially a parasitic power drain on the system (i.e. the power they consume is not available for useful work outside the fuel cell system). One such parasitic power-draining piece of auxiliary equipment is the pump used to circulate the liquid coolant through the fuel cell.

PEM fuel cells are temperature sensitive in that if the operating temperature is too high for too long, the membrane-electrolyte can begin to dehydrate causing a drop in the fuel cell's performance/voltage. Accordingly, PEM fuel cells (as well as other fuel cells) are cooled by flowing liquid coolant continuously therethrough. One cooling technique uses a constant speed pump that flows the coolant through the fuel cell at a constant rate set high enough to control the cell's temperature under full-power conditions. Another technique uses a variable speed pump that flows the coolant continuously through the stack at a variable rate determined by the load on the stack at any given point in time. However, due to design constraints of the fuel cell stack (i.e. the coolant flow channels within the stack), the coolant must flow at a certain minimum rate in order to achieve uniform flow distribution throughout the stack for uniform cooling of the stack. Such minimum flow rate is typically higher than is needed to remove the heat generated by the fuel cell stack when the stack is operating at low power levels (i.e. less than 25% full stack power), and hence generating relatively little heat. Hence even with a variable speed pump, more power is consumed by the coolant pump under low fuel cell load conditions than is necessary for cooling alone.

Highly efficient fuel cell systems are desirable. The efficiency of a fuel cell system is determined by dividing the net power of the system (i.e. power available for use outside of the system) by the potential power of the system, where the net power equals the amount of power produced by the fuel cell minus the parasitic power drain on the system, and the potential power equals the heating value of the fuel (kilojoules per gram) times the mass flow rate (grams per second) of the fuel supplied to the system. Hence, systems having high parasitic loads are less efficient then those having low parasitic loads. The present invention improves the efficiency of a fuel cell system by reducing the parasitic load imposed on the fuel cell system by the coolant pump when the fuel cell stack is operating at less than 25% full power.

SUMMARY OF THE INVENTION

The invention contemplates a process for improving the efficiency of a fuel cell system by only intermittently pumping coolant through the fuel cell when it is operating at low power levels. The invention is applicable to a fuel cell system that includes (1) a fuel cell that is designed for full power operation at a certain current density and has an anode and a cathode, (2) a liquid coolant flowing through the fuel cell, (3) a heat exchanger for extracting heat from the coolant, and (4) a pump energized by the fuel cell for pumping the coolant between the fuel cell and the heat exchanger. The process comprises the steps of: (i) supplying fuel to the fuel cell's anode; (ii) supplying oxidant to the fuel cell's cathode; (iii) drawing current from the fuel cell at a current density less then 25% of its full-power current density; (iv) while so drawing the current from the fuel cell, discontinuing the pumping of the coolant for an interval of time; (v) during the time interval that pumping is discontinued, allowing the temperature of the fuel cell to rise to a temperature that does not degrade the performance of the fuel cell; and (vi) restarting the pumping at the end of the time interval. The efficiency of the fuel cell system is increased by eliminating the parasitic load of the pump on said system during the interval that the pump is off. While the invention is applicable to any liquid-cooled fuel cell, it is particularly applicable to improving the efficiency of a fuel cell system having a temperature-sensitive PEM fuel cell operating at a current density less then 0.2 $A/cm^2$.

According to one embodiment of the invention, during the "pump-off" interval, the temperature of the fuel cell is allowed to rise to a predetermined/preset temperature. When that temperature is reached, the cooling flow is resumed by energizing the cooling pump again. For this embodiment, the temperature of the fuel cell will preferably be determined by monitoring the temperature of either the fuel exiting the anode (a.k.a. anode tailgas), or most preferably the oxidant exiting the cathode (a.k.a. cathode tailgas). Once started, the pump will preferably remain on until the oxidant tailgas temperature of the fuel cell drops to within 2 degrees of the coolant temperature exiting the fuel cell. Then the pump is shut off again.

According to another embodiment of the invention, the "pump-off" time interval will have one or more preset/timed duration(s) that has/have been determined empirically under controlled test conditions (e.g. in a laboratory). In this embodiment, the electrical output of the fuel cell is monitored, and the duration of the interval adjusted in response thereto based on the results of the empirical tests.

The invention will be better understood when considered in the light of the following detailed description of a preferred embodiment thereof, which is given hereafter in conjunction with the drawing.

BRIEF DESCRIPTION OF THE DRAWINGS

The FIGURE schematically depicts a simplified fuel cell system in accordance with the present invention.

DESCRIPTION OF THE PREFERRED EMBODIMENT

The FIGURE shows, in simplified form, a preferred fuel cell system of the present invention including a fuel cell 2 having an anode side 4 and a cathode side 6. Hydrogen 8 is supplied to the anode side 4 and exits as anode tailgas 10. Oxygen (air) 12 is supplied to the cathode side and exits as cathode tailgas 14. A liquid coolant (e.g. ethylene glycol and water) in coolant loop 16 is circulated through the fuel cell 2 and a heat exchanger (e.g. vehicle radiator) 18 by pump 20 which is energized by the fuel cell 2. The temperature of the coolant is measured at point 25 where it exits the fuel cell 2. The radiator 18 may have a fan and motor 24 for blowing ambient air through the radiator 18. According to this embodiment when the fuel cell system is operating below 25% of its full-power design point, a control circuit 22 measures the temperature of the cathode tailgas 14, and, in response thereto, turns on or shuts off the pump 20. Above 25% of the full-power level, the "pump-off" time is so short as to be of any significant efficiency benefit. When the temperature of the cathode tailgas 14 reaches a prescribed upper limit, the pump is turned on and circulates coolant through the fuel cell for so long as it takes for the temperature of the cathode tailgas to drop to within 2 degrees of the coolant temperature exiting the fuel cell stack 2 at point 25. When that temperature is reached, the pump 20 is turned off and remains off for a sufficient interval of time for the temperature of the cathode tailgas 14 to rise to the prescribed upper limit. The radiator fan motor 24 may be turned off at the same time as the pump 20 for added benefit. The upper limit is set at a temperature that will not degrade performance of the fuel cell. Hence, for example, where the fuel cell 2 is a PEM fuel cell that upper limit will be about 70° C., which is high enough that the pump can stay off for a prolonged period of time, but low enough to insure that the membrane electrolyte will not dehydrate to the point of causing the fuel cell's terminal voltage to drop.

For a PEM fuel cell that has been designed for vehicular propulsion, and has a "full-power" current density design point of 0.8 A/cm$^2$, the on/off condition of the pump 20 will be controlled by the circuit 22 when the load on the fuel cell falls below 0.2 A/cm$^2$. Such a PEM fuel cell would normally be operated nearly isothermally at a temperature of about 64° C. in this low power range. However, in the low-power range contemplated by the present invention (i.e. below 0.2 A/cm$^2$), the fuel cell will actually operate cyclically adiabatically in that the temperature of the fuel cell will rise over the interval of time when the pump is shut-off, and then drop back down when the pump is turned on. In such a cyclic mode of operation, the temperature of the PEM fuel cell can be allowed to drop to about 60° C. when the pump is on, and rise to about 68° C. when the pump is off for a total temperature excursion of 8° C. without affecting fuel cell performance or damaging the fuel cell. The duty cycle of the pump (i.e. % of time "on") will vary with the load on the fuel cell. The higher the load on the fuel cell, the longer the duration of the "pump-on" condition, and the shorter the "pump-off" interval. Hence for example when the fuel cell is at idle (i.e. no load other than parasitics required for system operation), very little heat is generated by the fuel cell and the duty cycle would be very low resulting in a more efficient system. A typical duty cycle for a 80 kw automotive (i.e. 0.8 A/cm$^2$ full power) PEM fuel cell stack operating at idle would be about 15% (e.g. 10 secs. "pump-on" & 55 secs. "pump-off"). On the other hand, at a load of 0.2 A/cm$^2$ the duty cycle would be about 65% (e.g. 15 secs. "pump-on" & 8 secs. "pump-off").

According to another embodiment of the invention, the duty cycle, and hence the duration of the "pump-off" interval, is preset and controlled by a timer at an interval sufficient to insure adequate cooling of the fuel cell at the 0.2 A/cm$^2$ current density level. Alternatively, a number of preset (i.e. timed) intervals are determined for different power levels of the fuel cell in the low power range contemplated by this invention The power output of the fuel cell is then monitored, and, using a lookup table and appropriate commercially available computer hardware/software, the proper "pump-off" time interval corresponding to that power output selected and implemented. As the current flow (and hence the current density) increases toward the 0.2 A/cm$^2$ level, the duration of the "pump-off" interval will gradually be shortened, and as the current flow decreases toward the 0.01 A/cm$^2$ level, the duration of the "pump-off" interval will increase. The duration of the time intervals that correspond to different fuel cell power levels for the lookup table will be determined empirically beforehand under controlled laboratory conditions where the voltage and temperature rise of the fuel cell is monitored at constant load, and the duration of the "pump-off" interval determined with respect to fuel cell performance (i.e. voltage) and durability (i.e. ability to tolerate temperature excursions). Different interval durations are determined for different loads applied to the fuel cell until a complete look-up table is constructed for the entire low power operating range (i.e. below 0.2 A/cm$^2$).

While the invention has been described in terms of certain specific embodiments thereof, it is not intended to be limited thereto but rather only to the extent set forth hereafter in the claims which follow.

What is claimed is:

1. A process for improving the efficiency of a fuel cell system that includes a fuel cell having an anode and a cathode and is designed for full power operation at a certain current density, a liquid coolant flowing through said fuel cell, a heat exchanger for extracting heat from said coolant, and a pump energized by said fuel cell for pumping said coolant between said fuel cell and said heat exchanger, said process comprising the steps of: supplying fuel to said anode; supplying oxidant to said cathode; drawing current from said fuel cell at a current density less then 25% of said full power current density; while drawing said current, discontinuing said pumping for an interval of time; allowing the temperature of said fuel cell to rise during said interval to a temperature that does not degrade the performance of said fuel cell; and starting said pumping at the end of said interval; whereby the efficiency of said system is increased by eliminating the parasitic load of said pump on said system during said interval.

2. A process for improving the efficiency of a fuel cell system including a PEM fuel cell having an anode and a cathode and is designed for full power operation at a certain current density, a liquid coolant flowing through said fuel cell, a heat exchanger for extracting heat from said coolant, and a pump energized by said fuel cell for pumping said coolant between said fuel cell and said heat exchanger, said process comprising the steps of: supplying fuel to said anode; supplying oxidant to said cathode; drawing current from said fuel cell at a current density less then about 0.2 A/cm$^2$; while drawing said current, discontinuing said pumping for an interval of time; allowing the temperature of said fuel cell to rise during said interval; to a temperature that does not degrade the performance of said fuel cell; and starting said pumping at the end of said interval; whereby the efficiency of said system is increased by eliminating the parasitic load of said pump on said system during said interval.

3. A process according to claim 2 wherein said temperature is allowed to rise to a predetermined first temperature, and said starting of said pumping commences when said first temperature is reached.

4. A process according to claim 3 wherein said first temperature is the temperature of the oxidant exiting the cathode.

5. A process according to claim 3 wherein said first temperature is the temperature of said fuel exiting said anode.

6. A process according to claim 2 wherein said interval has a preset duration.

7. A process according to claim 2 wherein said discontinuing of said pumping commences when the temperature of the oxidant exiting the cathode is within about 2 degrees of the temperature of the coolant exiting the fuel cell.

8. A process according to claim 2 wherein said discontinuing of said pumping commences when the temperature of the fuel exiting the anode is within about 2 degrees of the temperature of the coolant exiting the fuel cell.

9. A process according to claim 2 including the steps of monitoring said current and adjusting the duration of said interval upwardly when the current drawn from said fuel cell is such as to yield a low current density remote from said 0.2 A/cm$^2$ and downwardly when the current drawn from said fuel cell is such as to yield high current density near said 0.2 A/cm$^2$.

10. A process for improving the efficiency of a fuel cell system that includes a fuel cell having an anode and a cathode and is designed for full power operation at a certain current density, a liquid coolant flowing through said fuel cell, a heat exchanger for extracting heat from said coolant, a motor-driven fan energized by said fuel cell for blowing air through said heat exchanger, and a pump energized by said fuel cell for pumping said coolant between said fuel cell and said heat exchanger, said process comprising the steps of: supplying fuel to said anode; supplying oxidant to said cathode; drawing current from said fuel cell at a current density less then 25% of said full power current density; while drawing said current, shutting off said pump and said motor-driven fan for an interval of time; allowing the temperature of said fuel cell to rise during said interval to a temperature that does not degrade the performance of said fuel cell; and starting said pumping at the end of said interval; whereby the efficiency of said system is increased by eliminating the parasitic load of said pump and said fan on said system during said interval.

* * * * *